(12) United States Patent
Fisher-Jeffes

(10) Patent No.: US 8,155,241 B2
(45) Date of Patent: *Apr. 10, 2012

(54) SYSTEM FOR PROCESSING COMMON GAIN VALUES

(75) Inventor: Timothy Perrin Fisher-Jeffes, Cambridge, MA (US)

(73) Assignee: MediaTek Inc., Hsin-Chu (TW)

( * ) Notice: Subject to any disclaimer, the term of this patent is extended or adjusted under 35 U.S.C. 154(b) by 883 days.

This patent is subject to a terminal disclaimer.

(21) Appl. No.: 12/196,724

(22) Filed: Aug. 22, 2008

(65) Prior Publication Data

US 2009/0161796 A1 Jun. 25, 2009

Related U.S. Application Data

(60) Provisional application No. 61/008,966, filed on Dec. 21, 2007.

(51) Int. Cl.
*H03D 3/22* (2006.01)
*H04L 27/22* (2006.01)

(52) U.S. Cl. ............... 375/332; 375/340; 455/245.2; 455/251.1

(58) Field of Classification Search .......... 375/243, 375/253, 254, 261, 262, 265, 281, 284, 285, 375/316, 318, 332, 340, 341, 345; 455/232.1, 455/234.1, 234.2, 245.1, 245.2, 250.1, 251.1
See application file for complete search history.

(56) References Cited

U.S. PATENT DOCUMENTS

| 6,052,037 | A | 4/2000 | Kaku et al. | 332/100 |
| 6,154,503 | A * | 11/2000 | Strolle | 375/264 |
| 7,450,670 | B2 * | 11/2008 | Lui et al. | 375/345 |
| 2002/0141505 | A1 * | 10/2002 | Lundby | 375/261 |
| 2009/0161745 | A1 * | 6/2009 | Pedersen et al. | 375/227 |
| 2009/0161796 | A1 | 6/2009 | Fisher-Jeffes | 375/317 |

FOREIGN PATENT DOCUMENTS

EP 1 855 393 11/2007

OTHER PUBLICATIONS

Parker, "Techniques for the Blind Estimation of Signal to Noise Ratio for Quadrature Modulated Signals," International Symposium on Signal Processing and its Applications, ISSPA, Gold Coast, Australia, Aug. 25-30, 1996, pp. 238-241.

* cited by examiner

*Primary Examiner* — Young T. Tse
(74) *Attorney, Agent, or Firm* — Fish & Richardson P.C.

(57) ABSTRACT

A method includes receiving data elements representative of constellation points of a modulated signal. Each data element includes a gain. The method also includes identifying a common gain value among the received data elements, and adjusting the data elements to include the common gain value.

36 Claims, 7 Drawing Sheets

SYSTEM FOR PROCESSING COMMON GAIN VALUES

CLAIM OF PRIORITY

This application claims priority to U.S. Patent Application Ser. No. 61/008,966, filed on Dec. 21, 2007, the entire contents of which are hereby incorporated by reference.

BACKGROUND

This description relates to a system and method for processing data with common gain values to decode communication signals.

While communication system development continues to progress for achieving higher and higher transmission rates, channel conditions continue to limit system operability. For example, channel noise and other types of conditions may impair data transmission through a communication channel. Consequentially, received channel signals are processed by using a series of reconstruction phases to decode data imbedded in the received signals. By executing processes to account for the channel conditions during the reconstruction phases, signals may be demodulated and data decoded for use with one or more applications.

SUMMARY

In general, in one aspect, a method includes receiving data elements representative of constellation points of a modulated signal. Each data element includes a gain. The method also includes identifying a common gain value among the received data elements, and adjusting the data elements to include the common gain value.

Implementations may include one or more of the following features. The method may also include removing zero value data elements from the adjusted data elements. Additionally, a first portion of the adjusted data elements may be folded onto a second portion of the adjusted floating point data elements. The method may also include calculating an estimated value from the folded first portion and the second portion. A factor may be applied to the estimated value to identify a portion of the folded first portion and the second portion for saturation. The method may also include representing the identified portion with a reduced precision compared to the precision of the data elements. The common gain may have various values such as the maximum exponent value. Various factor values may used, for example, a value of approximately ⅖ may be used for a signal modulated signal as a Quadrature Phase Shift Keying (QPSK) signal. For a modulated signal that includes a Quadrature Amplitude Modulation (QAM) signal, a factor value of approximately ⅘ may be used. Various mathematical operations may be used for folding, for example, folding the first portion of the adjusted floating point data elements may include calculating an absolute value of the first portion of the adjusted floating point data elements.

In general, in one aspect, a system includes a communication receiver for receiving a modulated signal. The receiver includes a gain estimator for receiving data elements representative of constellation points of a modulated signal. Each data element includes a gain. The gain estimator is configured to identify a common gain value among the received data elements. The gain estimator is further configured to adjust the data elements to include the common gain value.

Implementations may include one or more of the following features. The gain estimator may be configured to remove zero value data elements from the adjusted data elements. The gain estimator may be further configured to fold a first portion of the adjusted data elements onto a second portion of the adjusted data elements. The gain estimator may be further configured to calculate an estimated value from the folded first portion and the second portion. The gain estimator may be further configured to apply a factor to the estimated value to identify a portion of the folded first portion and the second portion for saturation. The gain estimator may be further configured to represent the identified portion with a reduced precision compared to the precision of the data elements. Various factor values may used, for example, a value of approximately ⅖ may be used for a signal modulated signal as a Quadrature Phase Shift Keying (QPSK) signal. For a modulated signal that includes a Quadrature Amplitude Modulation (QAM) signal, a factor value of approximately ⅘ may be used. Various mathematical operations may be used for folding, for example, folding the first portion of the adjusted floating point data elements may include calculating an absolute value of the first portion of the adjusted floating point data elements.

In general, in one aspect, a computer program product is tangibly embodied in an information carrier and comprises instructions. When the instructions are executed, a processor performs a method that includes receiving data elements representative of constellation points of a modulated signal, in which each data element includes a gain. The method also includes identifying a common gain value among the received data elements, and, adjusting the data elements to include the common gain value.

Implementations may include one or more of the following features. The method may also include removing zero value data elements from the adjusted data elements. The method may also include folding a first portion of the adjusted data elements onto a second portion of the adjusted data elements. The method may further include calculating an estimated value from the folded first portion and the second portion. The method may further include applying a factor to the estimated value to identify a portion of the folded first portion and the second portion for saturation. The method may further include representing the identified portion with a reduced precision compared to the precision of the data elements. The common gain may have various values such as the maximum exponent value. Various factor values may used, for example, a value of approximately ⅖ may be used for a signal modulated signal as a Quadrature Phase Shift Keying (QPSK) signal. For a modulated signal that includes a Quadrature Amplitude Modulation (QAM) signal, a factor value of approximately ⅘ may be used. Various mathematical operations may be used for folding, for example, folding the first portion of the adjusted floating point data elements may include calculating an absolute value of the first portion of the adjusted floating point data elements.

In general, in one aspect, a system includes means for receiving a modulated signal. The receiving means for receiving data elements representative of constellation points of a modulated signal. Each data element includes a gain. The gain estimator is configured to identify a common gain value among the received data elements. The gain estimator is further configured to adjust the data elements to include the common gain value.

Implementations may include one or more of the following features. The means for receiving data elements may be further configured to remove zero value data elements from the adjusted data elements. The means for receiving data elements may be further configured to fold a first portion of the adjusted data elements onto a second portion of the adjusted data elements. The means for receiving data elements may be further configured to calculate an estimated value from the folded first portion and the second portion. The means for receiving data elements may be further configured to apply a factor to the estimated value to identify a portion of the folded first portion and the second portion for saturation. The means for receiving data elements may be further configured to represent the identified portion with a reduced precision compared to the precision of the data elements.

These and other aspects and features and various combinations of them may be expressed as methods, apparatus, systems, means for performing functions, program products, and in other ways.

Other features and advantages will be apparent from the description of the claims.

DETAILED DESCRIPTION

Figure 1:
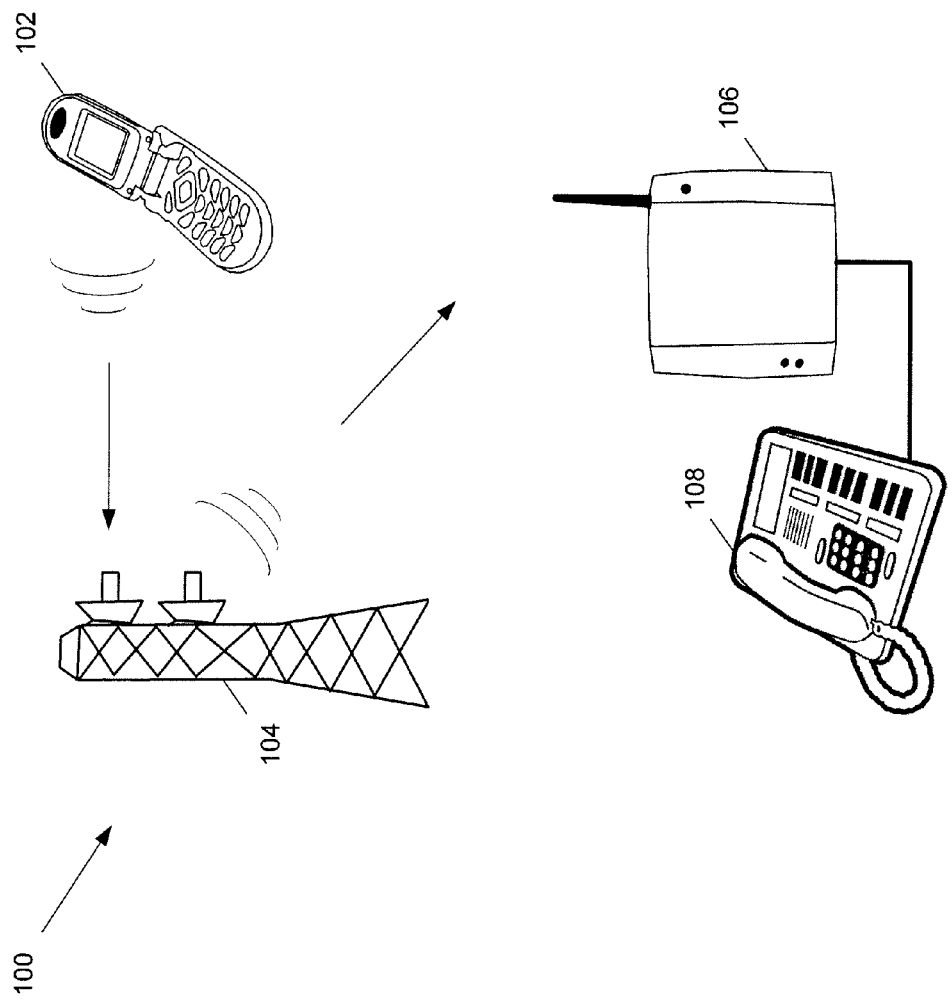
FIG. 1 illustrates a communication system.

Referring to FIG. 1, communication systems such as a cellular system 100 include communication channels that may be impaired by one or more sources such as environmental noise. To reduce the effects of such conditions, modulation, encoding/decoding and processing techniques have been developed to assist data reception. For example, with the ever increasing demand for higher data transmission rates, standards have been promoted to adopt particular techniques. For example, time division synchronous code division multiple access (TD-SCDMA) standards call for combining time division multiple access (TDMA) with an adaptive, synchronous-mode code division multiple access (CDMA) component. Further, various coding and modulation techniques may be used with the TD-SCDMA, for example, Quadrature Phase Shift Keying (QPSK) and quadrature amplitude modulation (QAM) modulation schemes may be implemented for improved channel conditions and signal transmission.

One or more coding and transmission schemes may be implemented with the cellular system 100 for complying with standards and for achieving particular data transfer rates. For example, coding for High-Speed Downlink Packet Access (HSDPA), which is a 3G (third generation) mobile telephony communications transmission scheme, may be implemented to allow the cellular system 100 (or other types of communication systems and networks such as Universal Mobile Telecommunications Systems (UMTS) to provide relatively higher data transfer speeds (and capacity) and lower latency for end users. HSDPA is an integral feature of Release 5 of the 3 GPP specification and supports downlink speeds of 14.4 Mbit/s and round trip delays of 70 ms. To support HSDPA, the High-Speed Downlink Shared Channel (HS-DSCH) has been added to the UMTS specification. HS-DSCH is the transport channel carrying the user data.

HS-DSCH may lack two fundamental features of other WCDMA channels, namely, variable spreading factor and fast power control. Rather, HS-DSCH provides improvements in downlink performance through the utilization of adaptive modulation and coding (AMC), a fast packet scheduling algorithm for base stations, and fast retransmission from base stations, often referred to as hybrid automatic repeat-request (HARQ). HARQ uses a combination of incremental redundancy (IR) and chase combining, in which data may be transmitted multiple time using one or more coding techniques. For example, when a corrupt packet is received, the packet is combined with retransmitted packets to efficiently correct encountered errors. In some situations in which the encoded retransmissions are corrupted, appropriate decoding may still yield an error-free packet.

By using such standards and processing techniques, the illustrative communication system 100 may allow efficient information transmission without significant content loss. For example, data (e.g., an audio signal) from a cellular telephone 102 may be transmitted to a cellular network (e.g., represented by a cellular tower 104) and appropriately routed to a fixed cellular terminal 106 for delivery at a telephone 108. Along with the fixed cellular terminal 106, other equipment may also be used for collecting and processing the communication signals, for example, a computing device (e.g., a computer system, personal digital assistant (PDA), etc.) with the appropriate equipment (e.g., modem, wireless connection device such as an air-card, etc.) may be used for connecting to the communication network (e.g., cellular system 100).

Figure 2:
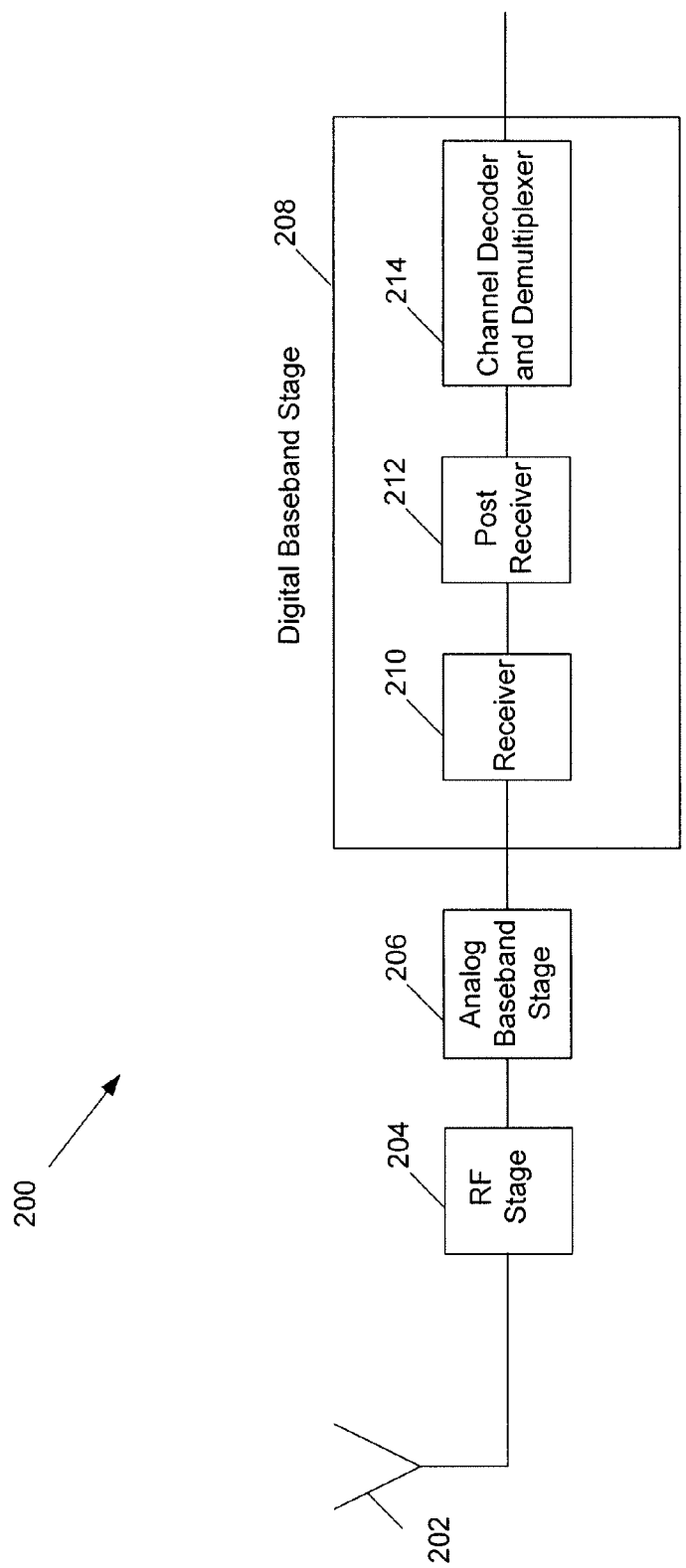
FIG. 2 is a block diagram of a portion of a communication receiver.

Referring to FIG. 2, a block diagram represents a portion of an exemplary communication receiver 200 of a wireless connection device such as a fixed cellular terminal or an air-card (for use with a computing device). In the illustration, an antenna 202 is capable of transmitting and receiving electromagnetic signals to exchange data with one or more other devices and networks (e.g., cellular systems). In regards to signal reception, the communication receiver 200 includes an radio frequency (RF) stage 204 that processes (e.g., down-converts to a baseband representation) the electromagnetic signals received by the antenna 202 and provides a corresponding analog signal to an analog baseband stage 206 for converting into the digital domain. In one implementation, the analog baseband stage 206 includes one or multiple analog-to-digital (A/D) converters for digitizing the signals from the RF stage 204. With the carrier signal removed and the signals digitized, a collection of data channels (referred to as physical channels) is provided to a digital baseband stage 208 that processes (e.g., demodulates, decodes, etc.) the channel data and produces binary data appropriately formatted for the next portion of the communication receiver 200 (e.g., a software application layer).

The digital baseband stage 208 includes a receiver 210 (e.g., a joint detector) that detects channels present in the digital data (provided from the analog baseband stage 206). For example, the digital data received by the receiver 210 may represent a number of channels (e.g., up to sixteen channels) that include various content (e.g., control channels, voice channels, etc.) The receiver 210 may also detect the physical channel present in the digital data. For example, the data received may represent a sum of physical channels, in which each channel includes a segment with an equivalent number of symbols (e.g., forty-four symbols). From the detected sum of physical channels, the receiver 210 may address a number of types of noise embedded in the digital signal. For example, noise may be introduced by multi-path signals received by the antenna 202, interference associated with the signal content (e.g., inter-code interference), etc. Various operations such as channel equalization along with other techniques and methodologies may be executed by the receiver 210 for addressing noise issues and signal correction.

A post receiver 212 (e.g., a post joint detector) also performs other operations in preparation of channel decoding such as preparing the physical channels for demodulation. For example, demodulating physical channels that implement QPSK and QAM (e.g., 16-QAM, 64-QAM, etc.) may be assisted by estimating parameters associated with the modulation schemes such as estimating constellation gain and variance. From the estimations, other quantities may be determined such as signal-and-interference-to-noise-ratio (SINR), for example, to assist with channel demodulation and to provide feedback (e.g., to one or more networks) that represents channel quality. Other operations may also be executed by the post receiver 212 (or another portion of the communication receiver 200), for example, constellation rotation operations may be executed for rotating QPSK or QAM constellations, as needed. In one particular implementation, each constellation may be rotated 45° by the post receiver 212 to produce constellations with equivalent orientations that are associated with one or more communication standards (e.g., W-CDMA, TD-SCDMA). By adjusting constellation orientation, hardware, software and other portions of the communication receiver 200 may be used with wireless standards associated with different constellation arrangements.

The post receiver 212 provides the extracted physical channels and other information (e.g., estimated parameters) to other portions of the communication receiver 200 (e.g., for demodulating and decoding the channels). For example, the channels are provided to a channel decoder and demultiplexer 214 (also included in the digital baseband stage 208) by the post receiver 212. From the data provided, the channel decoder and demultiplexer 214 demodulates and decodes individual transport channels and may provide additional conditioning prior to passing the decoded binary data to another portion of the communication receiver 200 (e.g., a software layer). In general, the channel decoder and demultiplexer 214 converts data received (from the post receiver 212) from a format corresponding to the points of the constellation being used (e.g., QPSK, QAM, etc.) to binary hard decisions. Complex values may be provided to the channel decoder and demultiplexer 214 that represent constellation points and formatted to comply with wireless standards such as W-CDMA (e.g., 12-bit floating point representation for Frequency Division Duplex (FDD), a 16-bit fixed point representation for Time Division Duplex (TDD), etc.). By processing such input, the channel decoder and demultiplexer 214 may represent the data in a reduced precision format (e.g., 4-bit fixed representation) to reduce storage needs while retaining or enhancing dynamic range.

Figure 3:
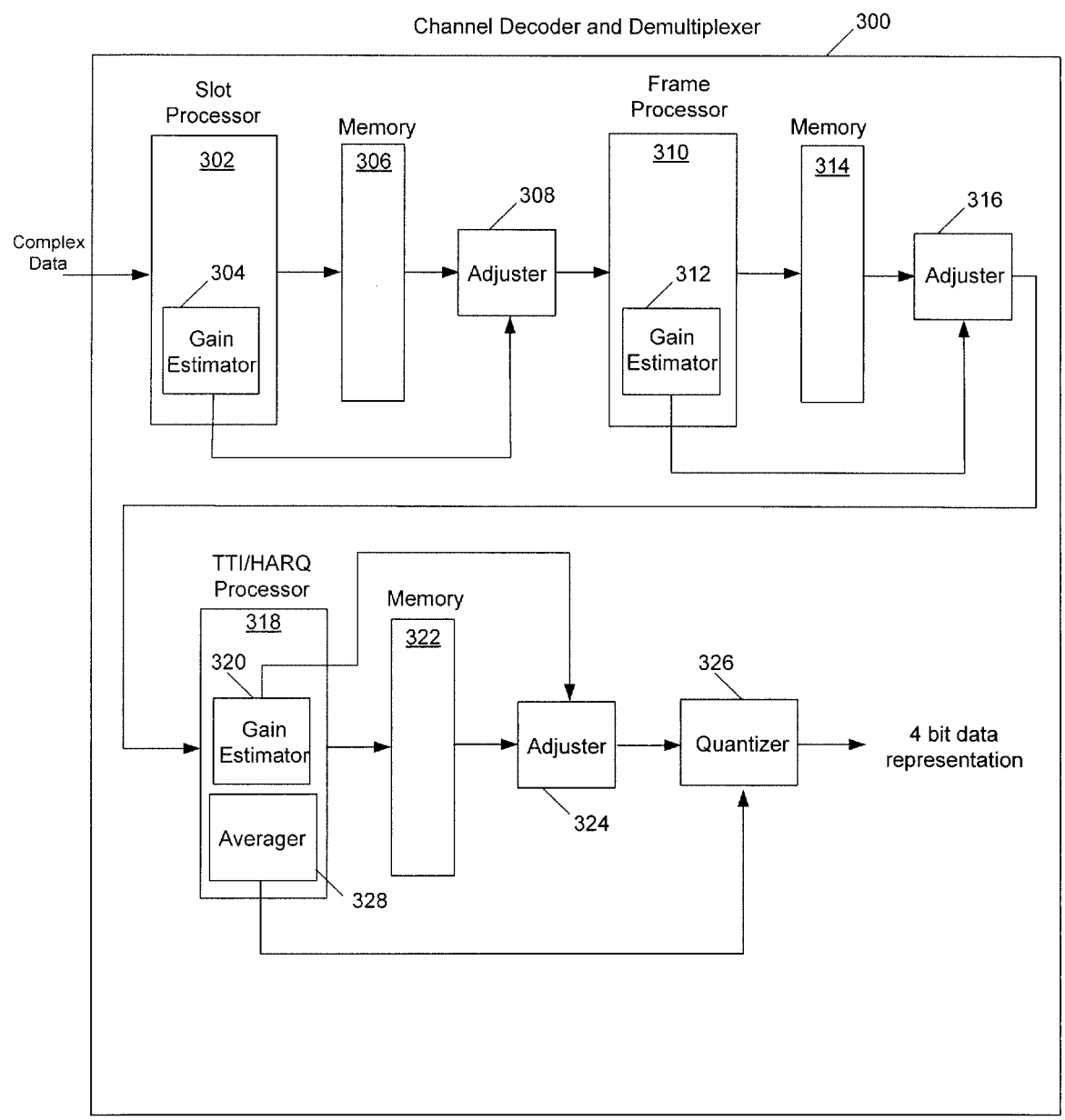
FIG. 3 is a block diagram of a portion of a channel decoder and demultiplexer.

Referring to FIG. 3, a portion of an exemplary channel decoder and demultiplexer 300 implements a block-floating point architecture for processing complex data provided from a receiver (e.g., a joint detector receiver, rake receiver, an equalizer, etc.). By implementing HARQ processing, data re-transmissions are attempted for each failed transmission. Such retransmissions are combined into a single encoded data packet burst prior to being decoded. However, in some situations, the time between re-transmissions may be significant and channel conditions may significantly change. As such, two separately transmitted data packets that are received for HARQ processing may have significantly different characteristics (e.g., power levels, SINR, etc.).

By appropriately weighting the transmissions, weaker signals may not adversely affect relatively stronger transmissions during recombination. In general, the channel decoder and demultiplexer 300 passes blocks of data through a data buffering and processing pathway. Each data block is stored with a common gain value (e.g., an exponent value) rather than storing each data element at its received precision value. As the blocks of data pass along with processing pathway, the blocks are merged with other blocks and the merged blocks are again adjusted to include a common gain value. For example, at various points along the processing pathway, the maximum gain value is determined and data elements (within a data block) are adjusted (e.g., by multiplication, division, bit shifting, etc.) to represent a value that includes the maximum gain value. In one implementation, such gain adjustment operations may occur in multiple instances along the processing pathway. For example, adjustments may be executed during processing individual soft decision values (referred to as slots), processing blocks of slots (referred to as frames) and processing blocks of frames (referred to as transmission time interval (TTI) processing) for merging existing HARQ data for HSDPA data channels (in preparation for decoding the data channels). By operating with a common gain, storage space is conserved while enhancing dynamic range. Furthermore, additional processing operations may be executed for quantizing and producing representations with reduced size (e.g., four-bit fixed point representation). For example, techniques may be implemented to account for the influences of quantization noise and truncation noise. Such techniques may include calculating a factor to balance the effects of quantization noise and truncation noise while preserving constellation point representations.

Referring to the figure, the channel decoder and demultiplexer 300 receives, from the post receiver 212, complex values (e.g., 12-bit floating point values, 16-bit fixed point values, etc.) that represent individual soft decisions. Processing provided by the channel decoder and demultiplexer 300 reduces the size of the numerical representation (e.g., from 12-bit floating point to 7-bit fixed point) and correspondingly storage space (e.g., memory) needs. In this particular arrangement, a series of three processing stages execute operations to establish common gains. Initially, the 12-bit floating point complex value representations (e.g., received in a data burst) are provided to a slot processor 302. Each burst of received data (referred to as a slot) includes multiple complex value representations and the slot processor 302 reduces the amount of data needed to represent the complex value by identifying a common gain (e.g., a common exponent) and correspondingly adjusting the representations for the common gain. For example, each complex value representation may include a sign, a mantissa and an exponent. By determining a common exponent value that can be used to represent each value, the mantissa values may be adjusted (to account for the common exponent) and stored for each representation along with a single representation of the common exponent, thereby conserving storage space.

To determine the common gain value, the slot processor 302 includes a gain estimator 304. One or more techniques and methodologies may be implemented to identify a common gain among multiple slots. For example, the gain estimator 304 may identify the maximum exponent value from the multiple slots (provided to the channel decoder and demultiplexer 300). As the gain estimator 304 processes the slots, to determine the maximum exponent value, the slot values (e.g., including sign, mantissa and exponent) are stored in a memory 306 (e.g., random access memory (RAM), dynamic RAM (DRAM), static RAM (SRAM), etc.) by the slot processor 302. Along with various types of memory, various memory sizes (e.g., 1280 bytes) may incorporated into the memory 306.

Once identified, the common gain value is provided to an adjuster 308 that executes operations such that each stored slot is adjusted to be represented with a mantissa and the common gain (e.g., the identified maximum exponent). For example, the adjuster 308 may use bit-level shift operations (e.g., left shift, right shift, etc.), multiplications, divisions, etc. such that each stored slot is represented with the common gain. In one illustrative example, an exponent value of eleven may be identified by the exponent estimator 304 as the maximum exponent (of a number of slots). For an individual slot value represented with an exponent of ten, the value in a binary representation may be shifted (e.g., right shifted) to convert the mantissa to a value associated with the common exponent value of eleven.

Once adjusted to a common gain, the slots may be processed with other slot groups (referred to as frames) such that all the groups are represented by a common gain value. In this arrangement, a frame processor 310 executes operations that include processing frames to determine a common gain among the frames. In some arrangements a frame may be defined as including fifteen slots, however, more or less number of slots may be used to define a frame. Similar to the slot processor 302, the frame processor 310 includes a gain estimator 312 that determines a common gain among two or more frames. For example, the gain estimator 312 may identify the maximum exponent values among the frames. As the gain estimator 312 identifies the common gain, frame data may be stored in a memory 314. By determining the common gain, less memory may be needed to store the representations of the frames, for example, a reduced number of bits (e.g., seven bits) may be used to represent each slot (included in each frame). As such storage space is conserved by identifying common gains and adjusting the representations (e.g., mantissas) to account for the common gains. Another adjuster 316 is also included in the channel decoder and demultiplexer 300 to correspondingly adjust each frame based upon the common gain (that is identified and provided by the gain estimator 312).

Once the frame is represented by a common gain, components of the channel decoder and demultiplexer 300 may compare groups of frames. For example, a TTI/HARQ processor 318 included in the channel decoder and demultiplexer 300 may compare groups of frames (e.g., 1 frame, 2 frames, 4 frames, 8 frames, etc.) to identify a gain that is common the frame groups. For this arrangement, the TTI/HARQ processor 318 includes a gain estimator 320 that operates similar to the gain estimators 304 and 312. For example, the gain estimator 320 may identify the maximum gain value (e.g., maximum exponent value) of multiple frame groups such that all the frame groups may be adjusted for representations that commonly use the identified maximum gain. Similar to the slot processor 302 and the frame processor 310, the TTI/HARQ processor 318 has an associated memory 322 that is used to store the frame groups and possibly other information (e.g., the common gain value). An adjuster 324, which may be similar to adjusters 308 and 316, is also included in the channel decoder and demultiplexer 300. Similar to the other adjusters 308, 316, the adjuster 324 correspondingly adjusts the frame groups such that the gain (identified by the gain estimator 328) is commonly used by the groups. As such, the data received by the channel decoder and demultiplexer 300 is scaled to share a common exponent from the processing provided from this block-floating-point architecture (e.g., processing first on a slot by slot basis, second on a frame basis and third on a frame group basis). Along with reducing storage needs, the common scaling reduces adverse affects of weaker signals received compared to stronger received signals.

The channel decoder and demultiplexer 300 also includes a quantizer 326 that provides operations, e.g., to further reduce the width of the data representations. For example, the width of the data representations (e.g., 7 bits) stored in the memory 322 by the TTI/HARQ processor 318 can be reduced (e.g., to 4 bits) by the quantizer 326. One or more techniques and methodologies may be used to provide such reductions. For example, by reducing a portion of the represented data, a reduced width may be used for representing constellation points. While such reduction can reduce quantization noise artifacts, significant reductions may introduce truncation noise into the data. As such, balancing quantization and truncation noise effects needs to be considered for data representation reductions. To determine the amount of data to truncate, an averager 328 is executed by the TTI/HARQ processor 318. By processing the groups of frames received by the TTI/HARQ processor 318 and stored in the memory 322, the averager 328 can provide an average estimation to the quantizer 326 for setting a data reduction threshold.

Figure 4:
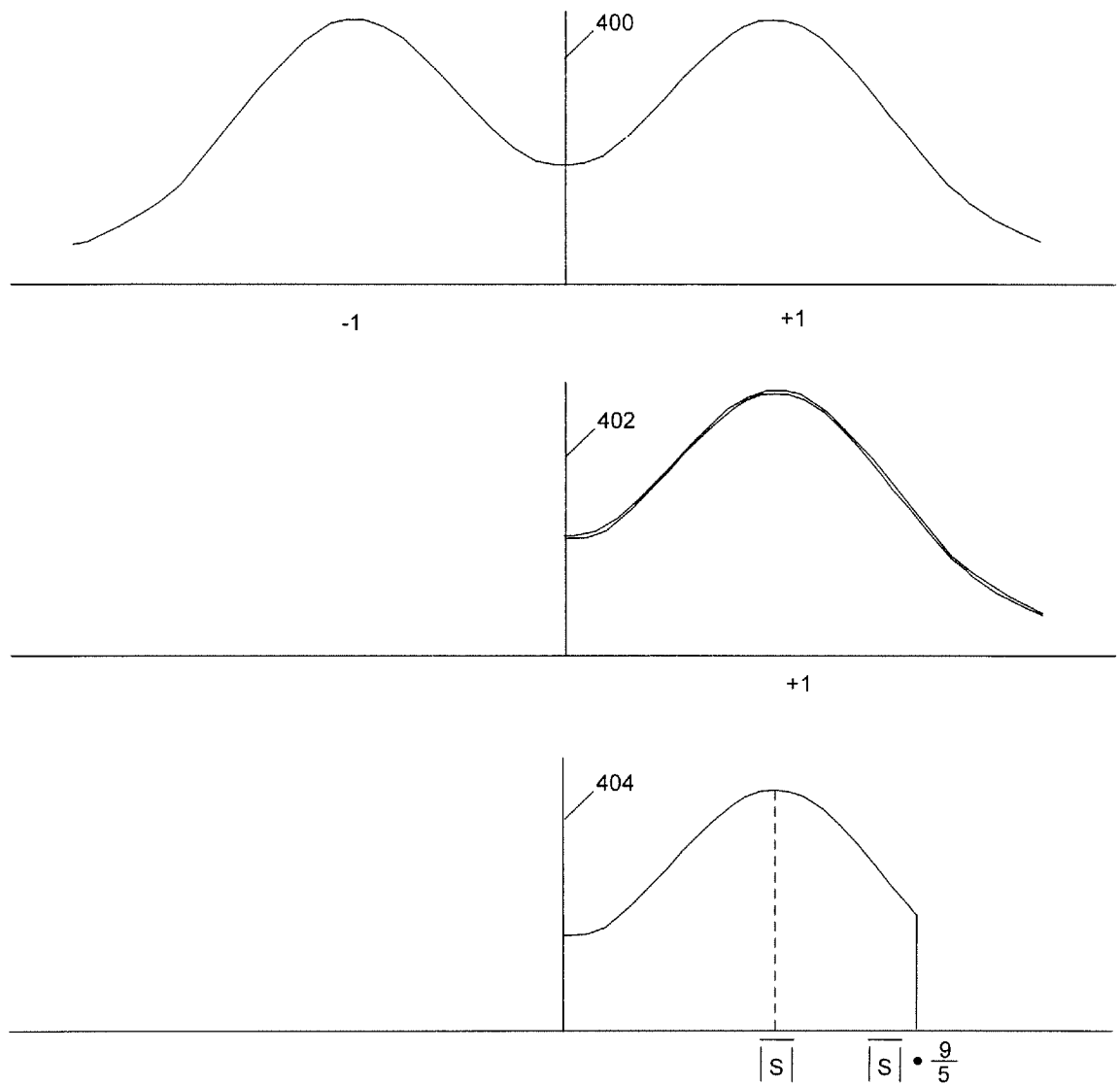
FIG. 4 includes charts that illustrate processing of constellation data.

Referring to FIG. 4, a series of three charts 402, 404, 406 illustrate exemplary operations of the averager 328 and the quantizer 326 to reduce data representation widths (e.g., from a width of 7 bits to 4 bits). In this example, data is transmitted by using QPSK (with four corresponding constellation points (1,1), (1,−1), (−1,1) and (−1,−1)). As such, the data is distributed about values of −1 and +1. The chart 402 represents a probability density function (PDF) of the seven bit data, which is centered about the components (+1 and −1) of the constellation points. To determine the average of the data, the averager 328 first folds the negative values included in the PDF onto the positive values. For one exemplary folding technique, the absolute value of the data is calculated, which in effect folds the negative values onto the positive values. As represented in chart 402, by calculating the absolute value, the data centered about the value −1 are transposed onto the positive values (centered about the value +1).

Once folded, the averager 328 calculates the estimated value (e.g., average value) of the folded data, as illustrated in chart 404. In this example, the estimated value is the average of the absolute value of the data and is represented as $\overline{|S|}$ and is provided to the quantizer 326 to calculate a threshold for data reduction. Dependent upon the modulation scheme used and other parameters, various types of calculations may be performed by the quantizer 326. For example, for transmitted signals that are modulated using QPSK, a factor of 9/5 (i.e., value of 1.8) may be applied to the average absolute value. Smaller and larger factors may also be included, for example, a factor of 4/5 may be applied to the average absolute value if a 16-QAM modulated scheme is used for data transmission. Such factors may be determined by using experimental and theoretical techniques, individually or in combination. In this particular example, chart 404 illustrates the factor of 9/5 being applied to truncate the data from the PDF. Some parameters that may also effect the factor value include coding rate, etc.

Returning to FIG. 3, to calculate the absolute-value-average, the averager 328 is provided the groups of frames processed by the TTI/HARQ processor 318, some of which may be stored in the memory 322. Since the data is received in bursts over time, one or more gaps (e.g., represented with zero inserted values) due to rate adaptation may be present in the data stored in memory 322. Such zero value gaps may skew the estimated value calculation due to the bias imposed by the inserted zero values. To account for such gaps in the data, the averager 328 also checks for zero values and removes the corresponding data points. While such an operation may remove legitimate zero value data, in this implementation, such data loss is considered acceptable.

Figure 5:
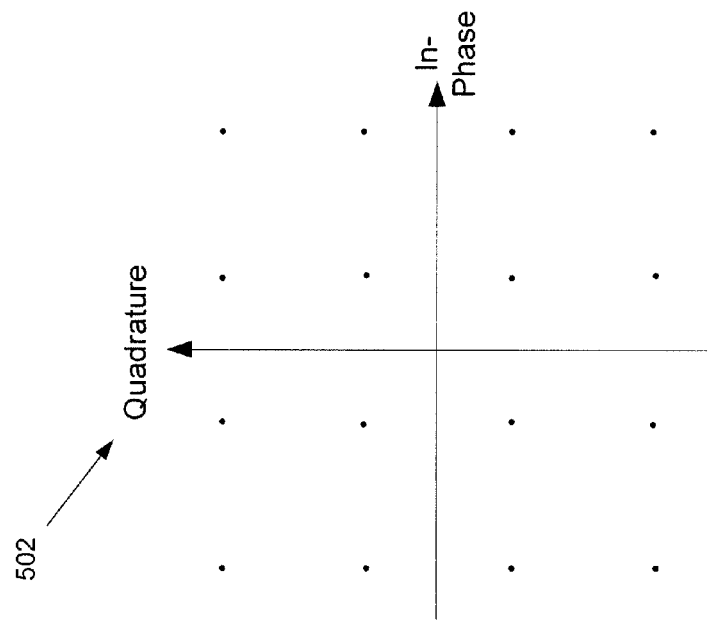
FIG. 5 illustrates constellation diagrams.
Figure 5:
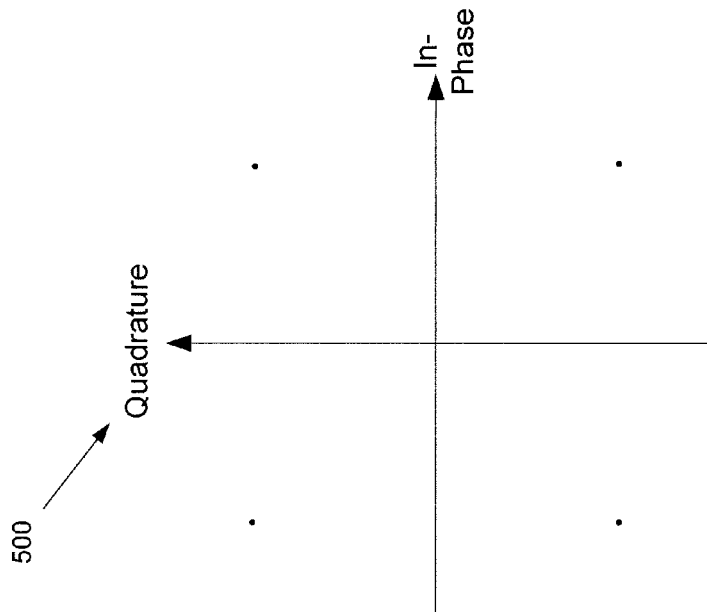

Referring to FIG. 5, two diagrams 500, 502 are illustrated that respectively represent constellations of two exemplary modulation techniques that may be used by the system 100 and demodulated by the communication receiver 200. In particular, constellation diagram 500 represents a QPSK modulated signal and constellation diagram 502 represents a 16-QAM modulated signal. For both diagrams, individual symbols are represented with complex values that include a real part (referred to as the in-phase component) represented on the horizontal axis and an imaginary part (referred to as the quadrature component) represented on the vertical axis. As illustrated, the constellation diagram 500 includes points with coordinate pairs (1,1), (1,−1), (−1,−1) and (−1,1) and as seen in the FIG. 4 data is distributed about values −1 and 1 in the chart 402 that represents PDF data. In a similar manner, transposed into a PDF representation, received data associated with the 16-QAM constellation diagram 502 would concentrate about the two positive and two negative values used to represent the sixteen 16-QAM constellation points. As mentioned above, a distinct scaling factor may be used (by the quantizer 326) dependent upon the modulation technique implemented. For example, a scaling factor of ⅗ may be used for QPSK signals while a factor of ⅘ may be used for 16-QAM signals. Other factors may also be used for QPSK and 16-QAM modulation signals and for variations of these modulations and other modulation techniques.

Figure 6:
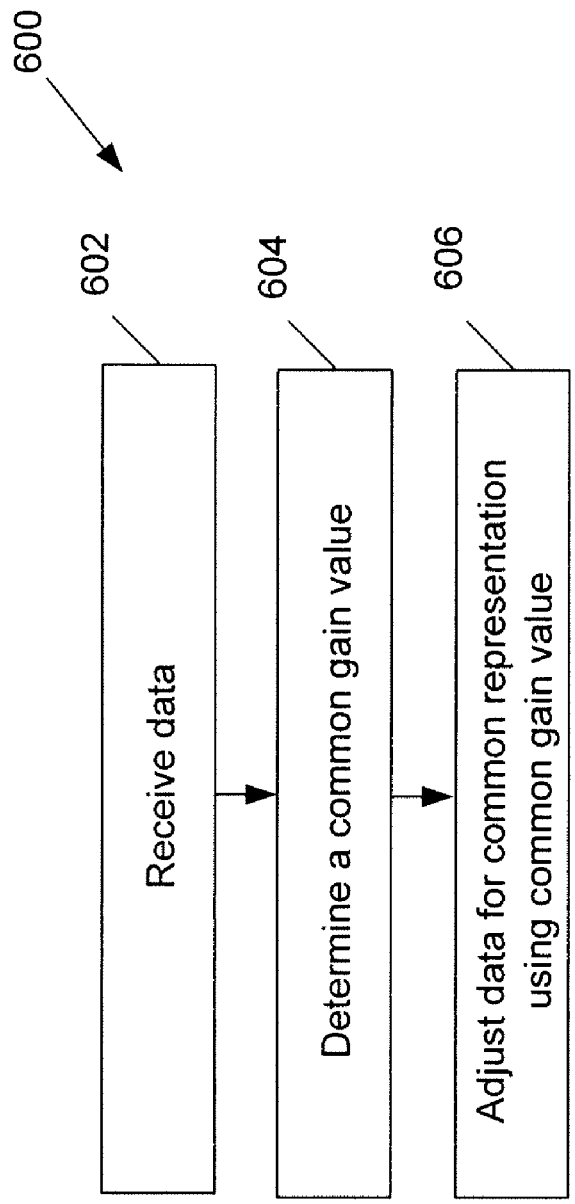
FIG. 6 is a flowchart of a operations of a gain estimator.

Referring to FIG. 6, a flowchart 600 represents some of the operations of the gain estimators 304, 312 and 320. As mentioned above, in one implementation the gain estimators may be respectively executed by the slot processor 302, the frame processor 310 and the TTI/HARQ processor 320. Various other implementations may used for executing the gain estimators 304, 312, 320, for example, two or more gain estimators may be executed on a common processor. Along with the processors 302, 310 and 320, operations of one or more of the gain estimators 304, 312, 320 may be executed by one or more other portions of the channel decoder and demultiplexer 300 or the communication receiver 200. Circuitry (e.g., digital logic) and computing devices (e.g., a computer system) may also be used individually or in combination to execute the operations of the gain estimators 304, 312 and 320. For example, in a processor based receiver design, instructions may be executed by a processor (e.g., a microprocessor) to provide the operations. Such instructions may be stored in a storage device (e.g., hard drive, CD-ROM, etc.) and provided to the processor (or multiple processors) for execution.

Operations of the gain estimators 304, 312 and 320 include receiving 602 data such as data elements that represents slots, frames, frame groups being processed by a channel decoder and demultiplexer. Typically, the received data elements have a floating point format that includes sign, mantissa and exponent portions, however, other formats may be used by the received data. Further, while the received data is usually represented with a single format, two or more different formats may be used to represent the data. As mentioned above, operations also include determining 604 a common gain value from the received data. For example, the maximum gain value may be identified from the data elements and used to convert the elements (if needed) to a common gain value. As mentioned above, in one implementation, mantissa values may be shifted (e.g., right shifted) such that each element is represented by the common exponent value (e.g., the maximum value). In the implementations illustrated in FIG. 3, the channel decoder and demultiplexer 300 includes adjusters 308, 316 and 324 that are provided the common gain value (e.g., maximum value) and correspondingly adjust the data elements, as needed. However, in some arrangements, the gain estimators may provide such functionality. For example, operations of gain estimator may also include adjusting 606 the data to be commonly represented by using the common gain value. Determining the difference between gain values along with multiplication and division operations (e.g., bit level right shift operations) may be used by the exponent estimator for such adjustments.

Figure 7:
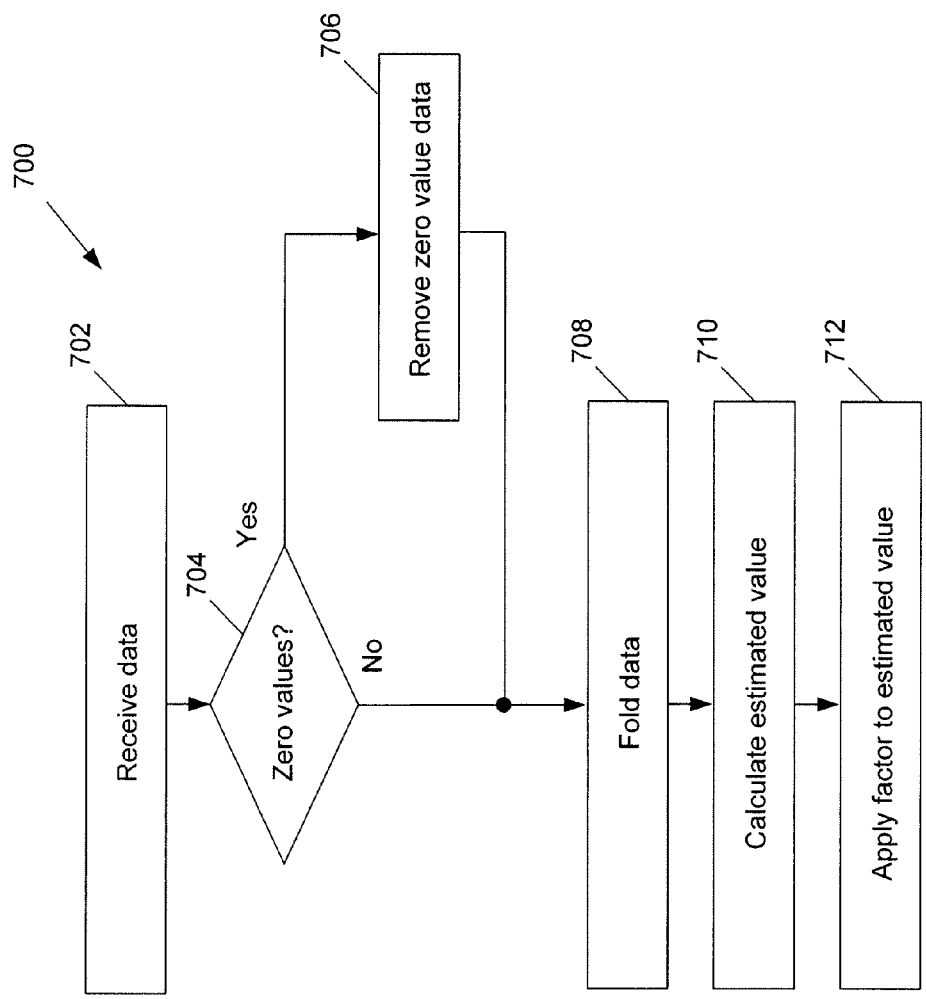
FIG. 7 is a flowchart of operations of an averager.

Referring to FIG. 7, a flowchart 700 represents some of the operations of the averager 328 (shown in FIG. 3). As mentioned above, in one implementation the averager 328 may be executed by the TTI/HARQ processor 320, however, other implementations may be used for executing the averager. For example, the averager 328 may be executed by another processor (e.g., the slot processor 302, the frame processor 310, etc.) or another appropriate component of the channel decoder and demultiplexer 300. The averager 328 may also be executed in a distributed manner, e.g., by implementing the processing capabilities of multiple processors (or other types of components) and portions of the channel decoder and demultiplexer 300 and the communication receiver 200. Circuitry (e.g., digital logic) and computing devices (e.g., a computer system) may also be used individually or in combination to execute the operations of the averager 328. For example, in a processor based receiver design, instructions may be executed by a processor (e.g., a microprocessor) to provide the operations. Such instructions may be stored in a storage device (e.g., hard drive, CD-ROM, etc.) and provided to the processor (or multiple processors) for execution.

Operations of the averager 328 includes receiving 702 data such as groups of frame processed by the TTI/HARQ processor 318, however, the averager may also be capable of processing other types of data processed by the channel decoder and demultiplexer 300. Along with previously processed frame groups stored in memory (e.g., the memory 322), data being processed by the TTI/HARQ processor 318 (e.g., being processed by the gain estimator 320) such that the received data includes elements with a common gain value (e.g., the maximum exponent value). Operations of the averager 318 also include determining 704 if one or more of the data elements represent a zero value. In such situations, the averager 328 removes 706 the zero value data elements. Once removed, or for the situation in which the data is absent zero value elements, a portion of the data elements are folded 708 onto another portion of the data elements. For example, the averager 318 may calculate the absolute value of the data such that negative values are folded upon positive values (as illustrated with chart 404 in FIG. 4). Once folded, operations of the averager 318 include calculating 710 the estimated value (e.g., mean average) of the folded data. As mentioned above, to reduce the data width used for representing data elements (e.g., from a 7-bit representation to a 4-bit representation), operations include applying 712 a factor to the estimated value. Such a factor, as mentioned above may be dependent upon the modulation scheme being implemented (e.g., a factor of approximately ⅗ for QPSK, ⅘ for 16-QAM, etc.). In the implementation illustrated in FIG. 3, the quantizer 326 applies the factor to the averaged-absolute data and saturates the appropriate data to reduce the data width of the constellation point representations. However, in some arrangements, the averager 328 may provide such functionality.

As mentioned above, in some receiver designs may be processor based. As such to perform the operations described in the flow charts 600 and 700, the exponent estimators 304, 312, 320 and the averager 328, and optionally with other portions of the channel decoder and demultiplexer 300 (e.g., adjusters 308, 316, 324, quantizer 326, etc.), may perform any of the computer-implement methods described previously, according to one implementation. For example, the communication receiver 200 may include a computing device (e.g., a computer system) for executing instructions associated with the gain estimators 304, 312, 320 and the averager 328. The computing device may include a processor, a memory, a storage device, and an input/output device. Each of the components may be interconnected using a system bus or other similar structure. The processor may be capable of processing instructions for execution within the computing device. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computing device. In one implementation, the memory is a computer-readable medium. In one implementation, the memory is a volatile memory unit. In another implementation, the memory is a non-volatile memory unit.

The storage device is capable of providing mass storage for the computing device. In one implementation, the storage device is a computer-readable medium. In various different implementations, the storage device may be a floppy disk device, a hard disk device, an optical disk device, or a tape device.

The input/output device provides input/output operations for the computing device. In one implementation, the input/output device includes a keyboard and/or pointing device. In another implementation, the input/output device includes a display unit for displaying graphical user interfaces.

The features described (e.g., the gain estimators 304, 312, 320 and the averager 328) can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Other embodiments are within the scope of the following claims. The techniques described herein can be performed in a different order and still achieve desirable results

What is claimed is:

1. A method comprising:
receiving data elements representative of constellation points of a modulated signal, wherein each data element includes a gain;
identifying a common gain value among the received data elements; and
adjusting the data elements to include the common gain value.

2. The method of claim 1, further comprising:
removing zero value data elements from the adjusted data elements.

3. The method of claim 2, further comprising:
folding a first portion of the adjusted data elements onto a second portion of the adjusted data elements.

4. The method of claim 3, wherein folding the first portion of the adjusted data elements includes calculating an absolute value of the first portion of the adjusted data elements.

5. The method of claim 3, further comprising:
calculating an estimated value from the folded first portion and the second portion.

6. The method of claim 5, further comprising:
applying a factor to the estimated value to identify a portion of the folded first portion and the second portion for saturation.

7. The method of claim 6, further comprising:
representing the identified portion with a reduced precision compared to the precision of the data elements.

8. The method of claim 6, wherein the modulated signal is a Quadrature Phase Shift Keying (QPSK) signal and the factor has a value of approximately $\%$.

9. The method of claim 6, wherein the modulated signal is a Quadrature Amplitude Modulation (QAM) signal and the factor has a value of approximately $\%$.

10. The method of claim 1, wherein the common gain value is a maximum exponent value.

11. A system comprising:
a communication receiver for receiving a modulated signal, the receiver including,
a gain estimator for receiving data elements representative of constellation points of the modulated signal, wherein each data element includes a gain, the gain estimator is configured to identify a common gain value among the received data elements, the gain estimator is further configured to adjust the data elements to include the common gain value.

12. The system of claim 11, wherein the gain estimator is further configured to remove zero value data elements from the adjusted data elements.

13. The system of claim 12, wherein the gain estimator is further configured to fold a first portion of the adjusted data elements onto a second portion of the adjusted data elements.

14. The system of claim 13, wherein the gain estimator is further configured to calculate an absolute value of the first portion of the adjusted data elements for folding the first portion of the adjusted data elements.

15. The system of claim 13, wherein the gain estimator is further configured to calculate an estimated value from the folded first portion and the second portion.

16. The system of claim 15, wherein the gain estimator is further configured to apply a factor to the estimated value to identify a portion of the folded first portion and the second portion for saturation.

17. The system of claim 16, wherein the gain estimator is further configured to represent the identified portion with a reduced precision compared to the precision of the data elements.

18. The system of claim 16, wherein the modulated signal is a Quadrature Phase Shift Keying (QPSK) signal and the factor has a value of approximately $9/5$.

19. The system of claim 16, wherein the modulated signal is a Quadrature Amplitude Modulation (QAM) signal and the factor has a value of approximately $4/5$.

20. The system of claim 11, wherein the common gain value is a maximum exponent value.

21. A non-transitory computer readable medium for storing instructions that when executed by a processor perform a method comprising:
receiving data elements representative of constellation points of a modulated signal, wherein each data element includes a gain;
identifying a common gain value among the received data elements; and
adjusting the data elements to include the common gain value.

22. The computer readable medium of claim 21, wherein the method further comprises:
removing zero value data elements from the adjusted data elements.

23. The computer readable medium of claim 22, wherein the method further comprises:
folding a first portion of the adjusted data elements onto a second portion of the adjusted data elements.

24. The computer readable medium of claim 23, wherein folding the first portion of the adjusted data elements includes calculating an absolute value of the first portion of the adjusted data elements.

25. The computer readable medium of claim 23, wherein the method further comprises:
calculating an estimated value from the folded first portion and the second portion.

26. The computer readable medium of claim 25, wherein the method further comprises:
applying a factor to the estimated value to identify a portion of the folded first portion and the second portion for saturation.

27. The computer readable medium of claim 26, wherein the method further comprises:
representing the identified portion with a reduced precision compared to the precision of the data elements.

28. The computer readable medium of claim 26, wherein the modulated signal is a Quadrature Phase Shift Keying (QPSK) signal and the factor has a value of approximately $9/5$.

29. The computer readable medium of claim 26, wherein the modulated signal is a Quadrature Amplitude Modulation (QAM) signal and the factor has a value of approximately $4/5$.

30. The computer readable medium of claim 21, wherein the common gain value is a maximum exponent value.

31. A system comprising:
means for receiving a modulated signal, including,
means for receiving data elements representative of constellation points of the modulated signal, wherein each data element includes a gain, the means for receiving the data elements representative of the constellation points is configured to identify a common gain value among the received the data elements, and the means for receiving data elements representative of the constellation points is further configured to adjust the data elements to include the common gain value.

32. The system of claim 31, wherein the means for receiving the data elements is further configured to remove zero value data elements from the adjusted data elements.

33. The system of claim 32, wherein the means for receiving the data elements is further configured to fold a first portion of the adjusted data elements onto a second portion of the adjusted data elements.

34. The system of claim 33, wherein the means for receiving the data elements is further configured to calculate an estimated value from the folded first portion and the second portion.

35. The system of claim 34, wherein the means for receiving the data elements is further configured to apply a factor to the estimated value to identify a portion of the folded first portion and the second portion for saturation.

36. The system of claim 35, wherein the means for receiving the data elements is further configured to represent the identified portion with a reduced precision compared to the precision of the data elements.

* * * * *

UNITED STATES PATENT AND TRADEMARK OFFICE
CERTIFICATE OF CORRECTION

PATENT NO. : 8,155,241 B2  
APPLICATION NO. : 12/196724  
DATED : April 10, 2012  
INVENTOR(S) : Timothy Perrin Fisher-Jeffes Page 1 of 1

It is certified that error appears in the above-identified patent and that said Letters Patent is hereby corrected as shown below:

Column 14, Line 33, In Claim 31, after "received" delete "the"

Column 14, Line 34, In Claim 31, after "receiving" insert -- the --

Signed and Sealed this
Twenty-ninth Day of May, 2012

David J. Kappos
*Director of the United States Patent and Trademark Office*